United States Patent
Freitag et al.

(10) Patent No.: US 7,126,307 B2
(45) Date of Patent: Oct. 24, 2006

(54) INTERFACE CIRCUIT FOR ACTUATING AN ELECTRICAL DEVICE AND CIRCUIT ARRANGEMENT FOR ACTUATING AN ELECTRIC MOTOR THEREWITH

(75) Inventors: Holger Freitag, Bochum (DE); Anton Münzebrock, Dortmund (DE); Burkhard Hasenack, Hagen (DE); Giuliano Persico, Wetter (DE); Erik Appel, Wetter (DE)

(73) Assignee: Demag Cranes & Components GmbH, Wetter (DE)

( * ) Notice: Subject to any disclaimer, the term of this patent is extended or adjusted under 35 U.S.C. 154(b) by 236 days.

(21) Appl. No.: 10/850,872

(22) Filed: May 21, 2004

(65) Prior Publication Data

US 2004/0239286 A1 Dec. 2, 2004

(30) Foreign Application Priority Data

May 30, 2003 (DE) ................. 103 24 881

(51) Int. Cl.
*H02P 1/24* (2006.01)
(52) U.S. Cl. .............. 318/727; 318/743; 318/289
(58) Field of Classification Search ............ None
See application file for complete search history.

(56) References Cited

U.S. PATENT DOCUMENTS

| | | | | | |
|---|---|---|---|---|---|
| 3,493,833 | A | * | 2/1970 | Swanke | 318/252 |
| 3,536,982 | A | * | 10/1970 | Jackson | 320/123 |
| 3,628,115 | A | * | 12/1971 | Pruitt | 318/269 |
| 3,716,770 | A | * | 2/1973 | Habisohn | 318/259 |
| 3,864,604 | A | * | 2/1975 | Pfanzelt | 361/6 |
| 3,971,971 | A | * | 7/1976 | Wycoff | 318/743 |
| 4,004,156 | A | * | 1/1977 | Schuller | 307/113 |
| 4,789,135 | A | * | 12/1988 | Watanabe | 254/362 |
| 5,210,473 | A | * | 5/1993 | Backstrand | 318/99 |
| 5,875,281 | A | * | 2/1999 | Thexton et al. | 388/801 |

FOREIGN PATENT DOCUMENTS

| | | |
|---|---|---|
| BE | 420340 | 3/1937 |
| DE | 6 609 573 U | 9/1968 |
| DE | 40 23 166 A1 | 2/1992 |
| DE | 9405631 | 7/1994 |
| EP | 575045 | 12/1993 |
| GB | 2283378 A * | 5/1995 |
| JP | 04275082 A * | 9/1992 |

* cited by examiner

*Primary Examiner*—Paul Ip
(74) *Attorney, Agent, or Firm*—Van Dyke, Gardner, Linn & Burkhart, LLP

(57) ABSTRACT

An interface circuit for actuating an electrical consumer, especially a pole-changing rotary-current induction motor, with a first contact element assigned to a signal line carrying an alternating voltage signal to generate at least two different control signals. A circuit arrangement is provided for actuating an electric motor, especially a pole-changing rotary-current induction motor, with a control switch element having an aforementioned interface circuit, which is connected via a signal line to a motor control of the electric motor. In order to achieve a reduction in the number of signal lines required as compared to a parallel transmission, while at the same time preserving the easy fault diagnosis, an encoding diode (10) is hooked up in series before or after the first contact element (6a, 7a) in the signal line (4) and a further second contact element (6b, 7b) is arranged in parallel with the encoding diode (2), so that depending on the positions of the first contact element (6a, 7a) and the second contact element (6b, 7b) three different control signals (19a, 19b, 19c) can be generated.

21 Claims, 4 Drawing Sheets

INTERFACE CIRCUIT FOR ACTUATING AN ELECTRICAL DEVICE AND CIRCUIT ARRANGEMENT FOR ACTUATING AN ELECTRIC MOTOR THEREWITH

BACKGROUND OF THE INVENTION

The invention concerns an interface circuit for actuating an electrical device, especially a pole-changing rotary-current induction motor, with a first contact element coordinated with a signal line carrying an alternating voltage signal in order to produce at least two control signals different from each other. The invention also concerns a circuit arrangement for actuating an electric motor, especially a pole-changing rotary-current induction motor, with a control-switching element having an aforesaid interface circuit, which is connected by a signal line to a control of the electric motor.

It is generally known how to transmit control signals between a control switch and an electric motor by a signal line. In this case, a control signal being transmitted is assigned to each wire of the line. The control signal is characterized by the presence of a voltage or the absence of a voltage on the signal line. One of these two signal states can then bring about functions such as "electric motor turns clockwise".

In the case of the control of pole-changing rotary-current motors, the individual control signals in combination with each other bring about, for example, the functions: "slow left-hand rotation", "slow right-hand rotation", "fast left-hand rotation" and "fast right-hand rotation". In this case, normally three control signals such as "right", "left" and "fast" are produced by a control switch. If no voltage is present on the control line for the "fast" control signal, the rotary-current motor will turn slowly in the direction imposed by the other control signal. If several axes of a device are motorized with corresponding pole-changing rotary-current motors, additional control signals must be generated by the control switch corresponding to the number of axes. For a three-axis device, such as an industrial bay traveling crane, in which the lifting mechanism, the lifting mechanism trolleys, and the lifting beam are driven by pole-changing rotary-current motors, nine signals and thus also nine signal lines are required, in addition to a reference potential line. Thus, this system entails high costs and a large wiring expense on account of the large number of signal lines.

A customary method of reducing the necessary number of signal lines while maintaining the information content in the form of the different control signals is to convert the parallel signals into serial information. In the state of the art, many serial transmission types are known, from the RS232 interface familiar in PC equipment to bus systems which can very quickly and securely transmit the control signals. The converting of the parallel control signals into serial information and the converting of them back for the subsequent control process is, however, cost-intense. Also, a fault diagnosis for the serial transmission of control signals is more difficult than for parallel signal lines.

SUMMARY OF THE INVENTION

The task of the present invention is to create an interface circuit and a circuit arrangement for actuating an electric motor therewith, which enables a reduction in the required number of signal lines as compared to a parallel transmission, while at the same time maintaining simple fault diagnosis.

This purpose is accomplished by an interface circuit with the features of claim 1 and a circuit arrangement for actuating an electric motor with the features of claim 6.

According to the invention, in an interface circuit for actuating an electrical consumer, especially a pole-changing rotary-current induction motor, with a first contact element coordinated with a signal line carrying an alternating voltage signal in order to produce at least two control signals different from each other, an especially simple circuit is achieved in that a diode is hooked up in series with die first contact element in the signal line, either before or after it, and an additional second contact element is arranged in parallel with the diode, so that three control signals which are different from each other can be produced depending on the positions of the first contact element and the second contact element. In this way, only a simple diode and an additional switch element with several contact elements is required to actuate a pole-changing rotary-current motor. Thus, a single signal line cannot only transmit the information "ON" or "OFF", but also three states such as "ON", "HALF" or "OFF" can be transmitted. Therefore, one signal line is saved for each pole-changing rotary-current motor, which leads to a reduction of the material and wiring expense by a third. The fault diagnosis can occur, as in the case of parallel transmission, with a simple voltage meter.

In an especially simple embodiment, the following control signals are made available in that a first open contact element and a second open contact element produce an "OFF" signal as a control signal, a first closed contact element and a second open contact element produce a "HALF" signal as a control signal in the form of the propagation of a half-wave of the alternating voltage signal on the signal line, and a first closed contact element and a second closed contact element produce an "ON" signal as a control signal in the form of the propagation of a full alternating voltage signal on the signal line.

This interface circuit is especially suitable for use with an electrical consumer that is configured as a pole-changing rotary-current induction motor. Then, a first key switch for the left running function with a first contact element and a second key switch for the right running function with a first contact element is coordinated with an encoding diode, and a common sequential closing contact element for the fast running function is coordinated with the first key and the second. In this way, one contact element can be saved. The first contact element is then connected to a first conductor of the signal line and the second contact element to a second conductor of the signal line.

In this interface circuit, an EMERGENCY STOP switch can easily be hooked up in front of the first and second contact elements without additional wiring expense.

This interface circuit is also suitable for application in a circuit arrangement to actuate an electric motor, especially a pole-changing rotary-current induction motor. The interface circuit is then integrated in a control switch element that is connected via a signal line to a motor control of the electric motor. The motor control in this case is divided into a motor switch and a signal decoder. The motor switch is connected to the electric motor for its actuation and the signal decoder processes the signals arriving from the interface circuit by the signal line for routing to the motor switch.

The invented interface circuit and the actuation circuit are explained more closely hereafter by means of two illustrated sample embodiments.

DESCRIPTION OF THE PREFERRED EMBODIMENT

Figure 1:
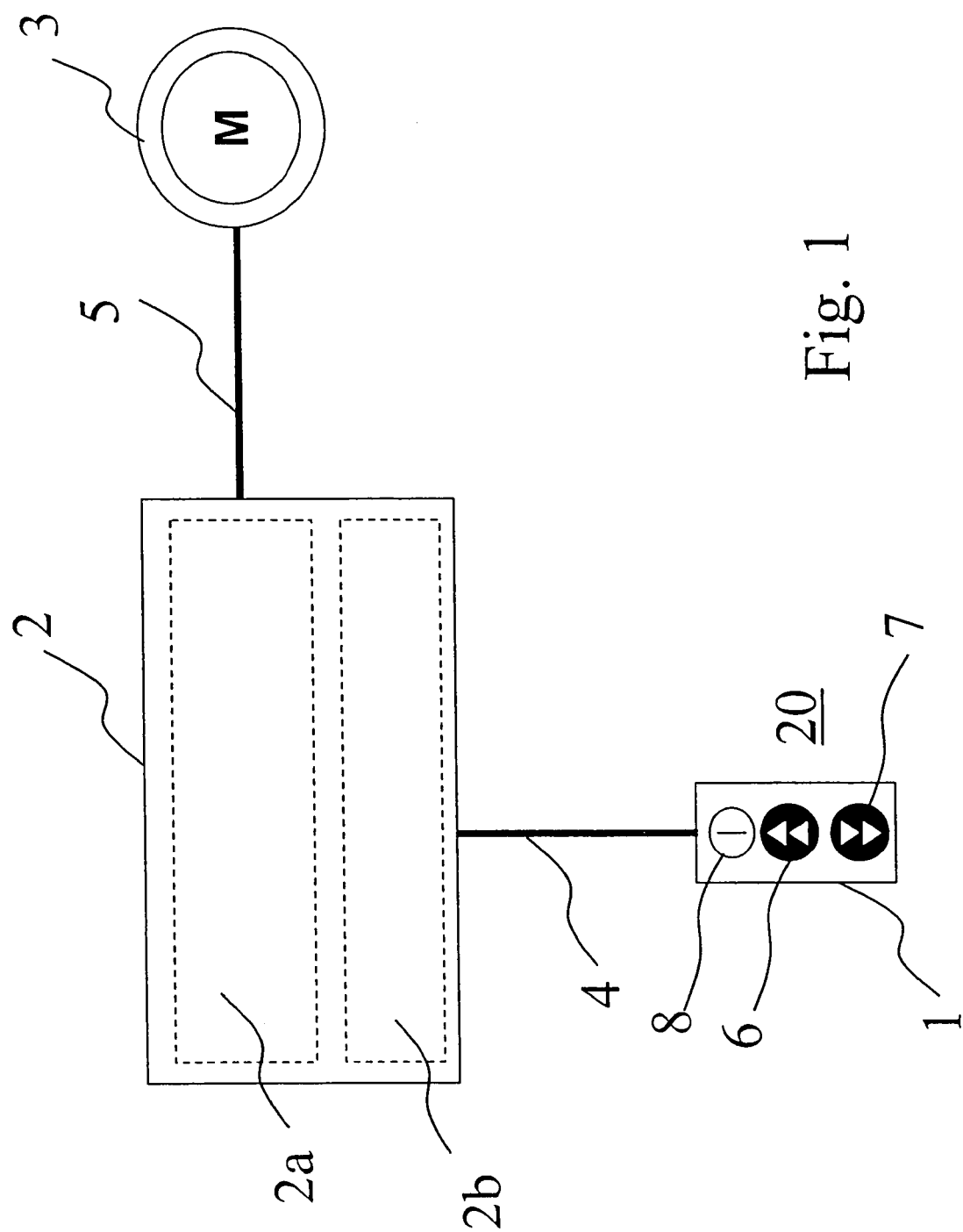
FIG. 1 is a schematic representation of a sample application for an interface circuit, according to the invention.

FIG. 1 shows a sample application for an interface circuit 20 for actuating an electric motor 3 of a lifting mechanism. Basically, there are depicted a control switch element 1, a motor control 2, and an electric motor 3 configured as a pole-changing rotary-current induction motor, which can drive the lifting mechanism (not shown) with two opposite directions of rotation (lifting and lowering) and two speeds. The motor control 2 contains a motor switch 2a for controlling the electric motor 3 and a signal decoder 2b for evaluating the control signals 19a, 19b, 19c from the control switch element 1 (see FIG. 3). The control switch element 1 is connected via a signal line 4 to the motor control 2, which, in turn, is connected via a motor line 5 to the electric motor 3, especially the stator windings (not shown) of the rotary-current induction motor.

The control switch element 1 has several manually activated switch elements, which are configured in the form of a locking switch 8 for the "EMERGENCY STOP" function, a first two-stage self-resetting pushbutton 6 for the "LEFT" direction of turning and a second identical pushbutton 7 for the "RIGHT" direction of turning. With the pushbuttons 6, 7, an operator controls the "LEFT" or "RIGHT" direction of turning of the electric motor 3 as desired and, with the second stage of the particular pushbutton 6, 7, the fast speed of the electric motor 3.

Figure 2:
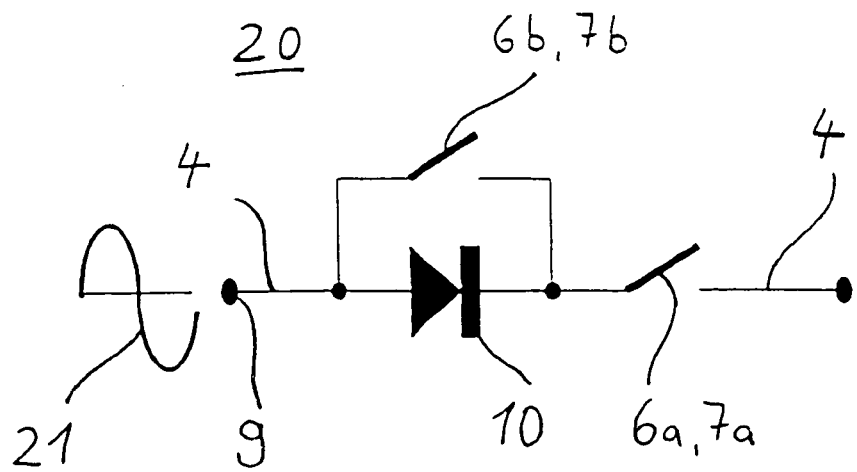
FIG. 2 is a circuit diagram of an interface circuit, according to the invention.

In FIG. 2, the interface circuit 20 is represented as a circuit diagram for one of the pushbuttons 6 or 7 including a diode 10 and two switchable contact elements 6a, 7a and 6b, 7b of the pushbuttons 6, 7 for encoding signals. The diode 10, referred to as an encoding diode, is electrically connected in the signal line 4 which leads to the motor control 2 of the electric motor 3. On the signal line 4, there is imposed an alternating voltage signal 21, which can be transformed by the interface circuit 20 into three control signals 19a, 19b, 19c different from each other. These control signals 19a, 19b, 19c then accomplish the desired functions "LEFT RUNNING", "RIGHT RUNNING", "SLOW" and/or "FAST" at the electric motor 3. For evaluating the control signals 19a, 19b, 19c the signal decoder 2b, is arranged in the region of the electric motor 3.

In order to generate the control signals 19a, 19b, 19c, the first contact element 6a or 7a is connected in electrical series connection with encoding diode 10 and the second contact element 6b or 7b is connected in parallel with the encoding diode 10. The two contact elements 6a, 7a and 6b, 7b can be integrated, for example, in a pushbutton 6, 7, which is configured as a multiple-stage switch. The contact elements 6b, 7b are then configured accordingly as sequential closing contact elements.

Figure 3:
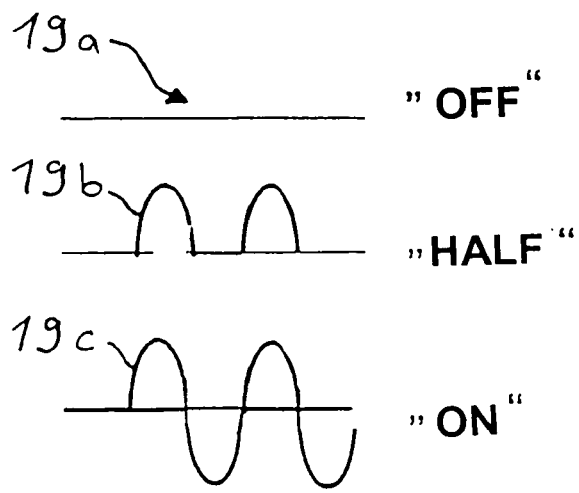
FIG. 3 is a schematic representation of the three different control signals generated by the interface circuit in FIG. 2.

The control signals 19a, 19b, 19c that can be generated by interface circuit 20 are represented in FIG. 3. The first control signal 19a, designated as "OFF" is generated when the first and the second contact element 6a, 7a and 6b, 7b are open. Thus, no alternating voltage signal 6 is transmitted on the signal line 4 in the direction of the motor control 2. The second control signal 19b "HALF" is generated when the second contact element 6b, 7b is open and the first contact element 6a, 7a is closed. Thus, the alternating voltage signal 21 flows through the decoder diode 10 and its bottom half-wave is cut off. Now, if he second contact element 6b, 7b is also closed, rho alternating voltage signal 21 bypasses the decoder diode 10 and the alternating voltage signal 21 fully reaches the motor control 2 as the control signal 19c "ON".

Figure 4:
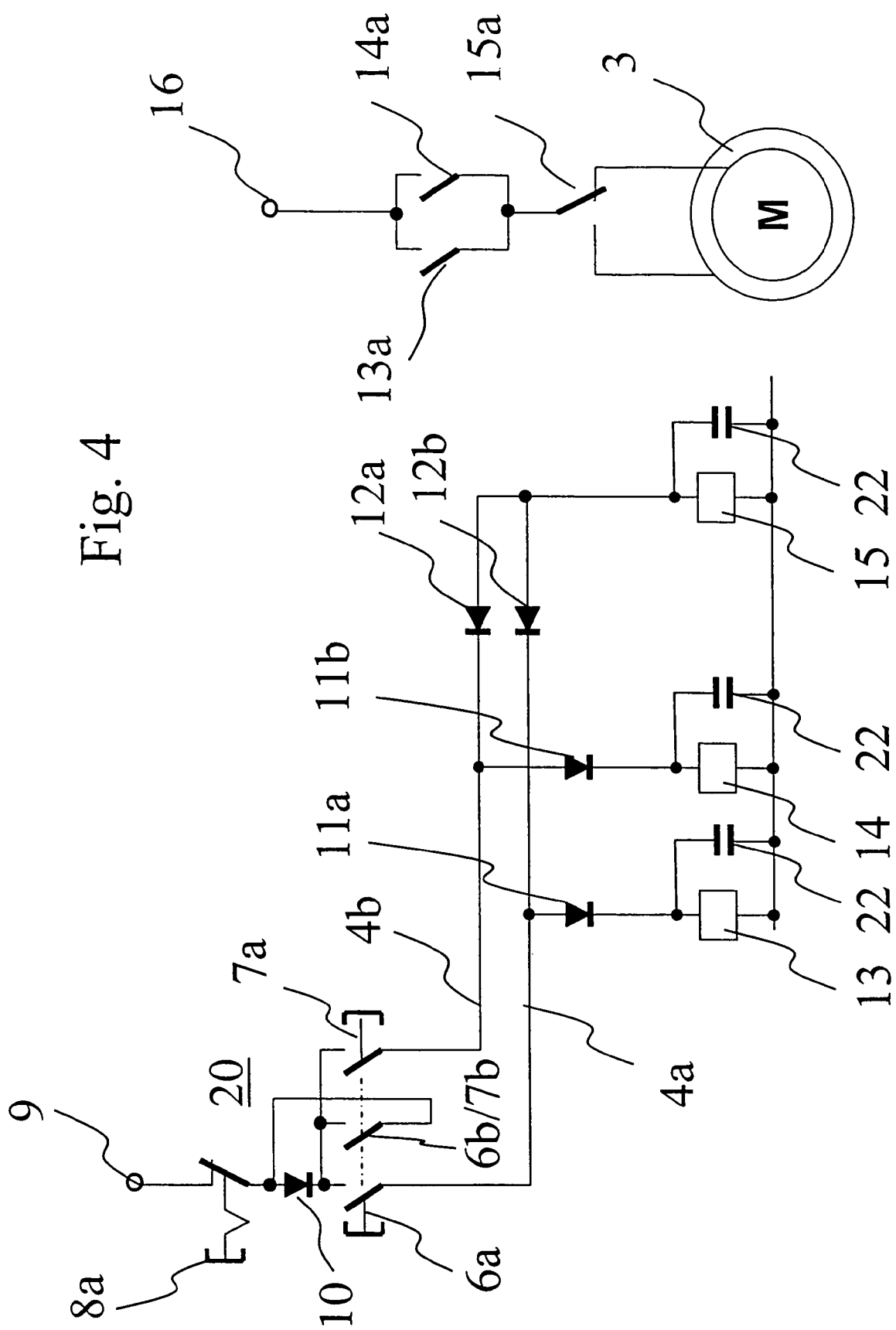
FIG. 4 is a circuit diagram of a first embodiment of the interface circuit, according to the invention.

FIG. 4 shows a circuit diagram of a first embodiment of interface circuit 20 for the application represented in FIG. 1. The elements with reference numbers 6 through 10 symbolize the functions of the control switch element 1; the elements with reference numbers 11 and 12 fulfill the function of signal decoding and the elements with reference numbers 13 through 15, the function of the motor switch 2.

The signal voltage—for example, 24 V alternating voltage 21 (see FIG. 2)—is supplied to the control switch element 1 at the terminal 9. With the opening contact 8a of the "EMERGENCY STOP" switch 8, the operator can interrupt the voltage supply to the control switch element 1 in an emergency, so that all signal output is prevented.

Operation of interface circuit 10 as already explained essentially in conjunction with FIG. 2 by the interaction of the contact element 6a for "LEFT RUNNING" and the contact element 7a for "RIGHT RUNNING", as well as the common sequential closing contact 6/7b, which can be operated by either pushbutton element 6 and 7 will now be explained.

When the pushbutton 6 is pressed, at first the contact element 6a is closed and thus conducts the alternating voltage 21 applied at 9 across the encoding diode 10 and the closed contact 6a, the subsequent first conductor 4a of the signal line 4, and the fourth decoding diode 12b to the relay coil 15 for the speed stages and across the first decoding diode 11a to the relay coil 13 for left running. Because of the opposite polarity of the encoding diode 10 and the fourth decoding diode 12b, the relay coil 15 cannot respond, since no current flow is possible. The encoding diode 10 and a first decoding diode 11a have the same polarity, so that the relay coil 13 for left running receives current during the positive half-wave of the signal voltage 21. Thus, the relay coil 13 for left running responds and the corresponding three-pole contact set 13a is closed, so that the motor 3 is connected via the resting contact 15a of the other relay coil 15 for the speed stage "FAST" or "SLOW" to the rotary-current network terminal 16. The resting contact 15a preferably connects the motor winding for low speed to the rotary-current network. In this circuit condition, the negative half-wave of the signal voltage is blocked by the encoding diode 10,, but the relay coil 13 continues to be supplied with current from the parallel switched capacitor 22, now discharging, so that the contact 13a remains closed. The phase sequence of the contact set 13a is switched so that the "LEFT RUNNING" of the rotary-current induction motor 3 is selected.

If one presses further on the first pushbutton 6, the second switch stage of the sequential closing contact element 6/7b is closed, so that the encoding diode 10 is shunted. As a result, both half-waves of the alternating signal voltage 21 are now switched by the first pushbutton 6, so that both the relay coil 13 for the left running and the relay coil 15 for the speed stage, which is energized during the negative half-wave of the signal voltage 21, are now supplied with current.

This means that the three-pole contact set 13a continues to remain closed and the three-pole contact set 15a is switched into working position, so that the winding for the fast speed of the rotary-current induction motor 3 is excited. The result is that the motor 3 operates in conditions "LEFT RUN-NING" and "FAST".

In order to actuate the "RIGHT RUNNING" condition of the motor 3, one operates the pushbutton 7 similar to the above-described operating sequence for the pushbutton 6, so that in the first switching stage the contact element 7a controls, across the adjoining second conductor 4b of the signal line 4 and the second decoding diode 11b, the relay 14 for right running with the three-pole contact set 14a, which switches the phase sequence for the "right running". As the pushbutton 7 is depressed further, the sequential closing contact element 6/7b is closed, so that the relay coil 15 for the speed stage once again additionally switches the contact set 15a across the third decoding diode 12a into the position for the fast speed.

Thus, FIG. 4 shows how a rotary-current induction motor 3 with two directions of running "LEFT RUNNING" or "RIGHT RUNNING", and two speeds "FAST" or "SLOW" can be controlled by the invented signal interface 20 in a way that saves on wiring with only two signal conductors 4a and 4b of one signal line 4 and one conductor (not shown) to provide the signal voltage between control switch element 1 and motor control 2, and the "EMERGENCY STOP" function required in many applications can be integrated without additional wiring expense.

Figure 5:
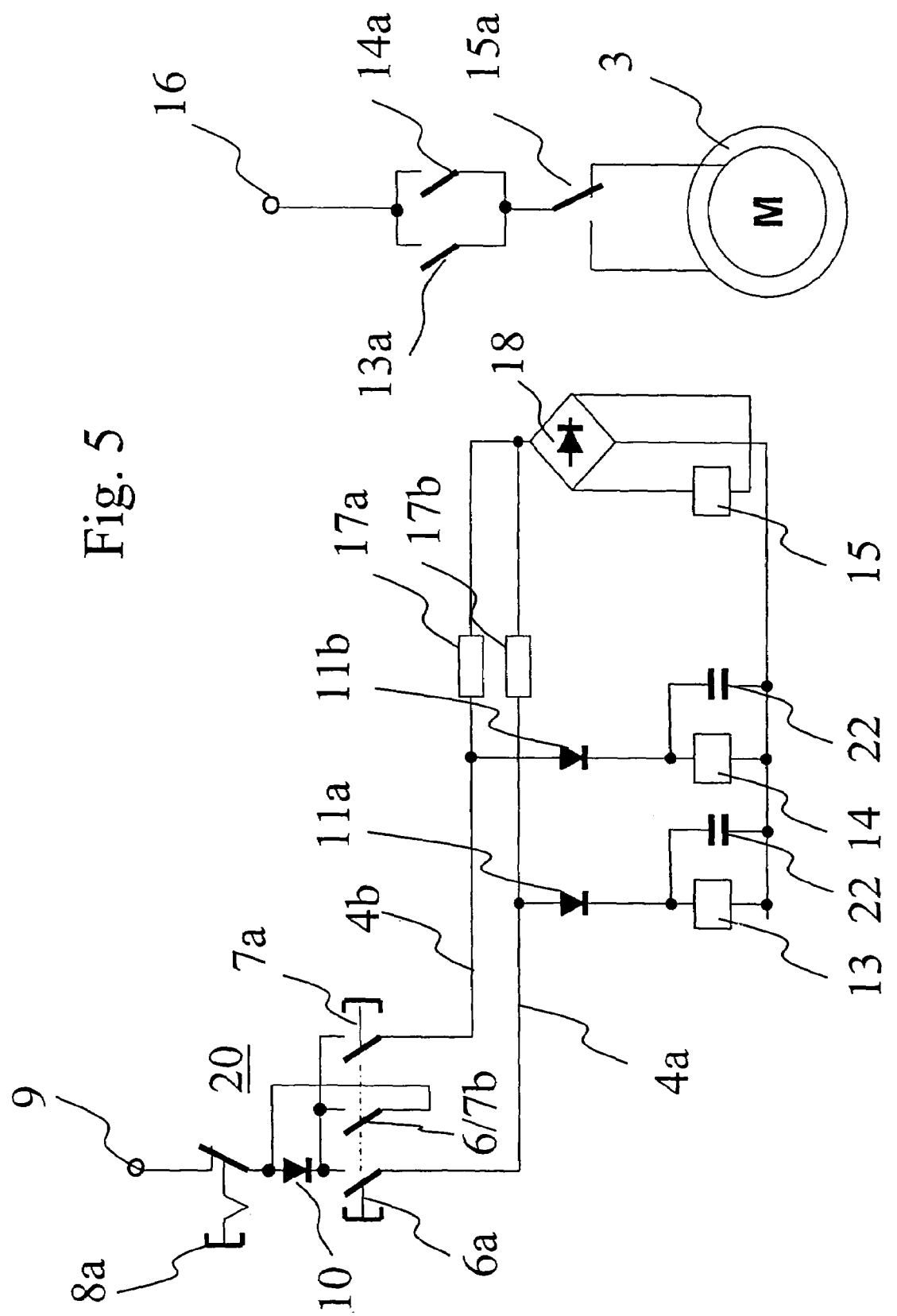
FIG. 5 is a circuit diagram of a second embodiment of the interface circuit, according to the invention.

FIG. 5 shows an alternative embodiment of the interface circuit 20 of FIG. 4. Here, the relay coil 15 for the speed stages is, when the sequential closing contact element 6/7b is closed, excited by the alternating voltage which is rectified by means of the rectifier bridge 18, whereupon the contact set 15a is switched from the resting position to the working position, i.e., the switch between "slower" and "faster" speed occurs. The voltage drop at the resistors 17a and 17b arranged respectively in the first and second conductor 4a and 4b of the signal line prevents reaching the operating voltage of the relay coil 15 in the switch condition where only one half-wave of the alternating signal voltage 21 is switched through, that is, in the "slow" speed contact position. At the same time, the voltage drop at these resistors 17a and 17b prevents a feedback between the relay coils 13 and 14. For example, in the case when the contact element 6a is closed and the relay coil 13 for left running is energized, the voltage drop at resistors 17b and 17a prevents the relay coil 14 from receiving sufficient operating voltage at the same time via the pathway 17b, 17a, 11b.

In a further embodiment of the invented application, one can use mechanical locking or additional contacts in a familiar manner to prevent the contacts 13a and 14a from being closed at the same time by simultaneous operation of the pushbuttons 6 and 7, which would result in short circuiting of two phases of the network power supply.

By using the interface circuit 20, only two conductors 4a, 4b are required for the signal transmission for the signal line 4 in the represented case and one conductor (not shown) for the signal voltage supply.

Embodiments are also possible in which the signal decoder 2b in the motor control 2 does not occur by correspondingly switched diodes, as represented and described in FIGS. 4 and 5, but instead by evaluating the signals transmitted by means of the lines 4a and 4b in a microprocessor. In this case, the microprocessor with its outputs will furnish current to the relay coils 13, 14 and 15 in the desired manner by means of semiconductor switches, so that the relay contacts 13a, 14a and 15a connect the motor to the rotary-current network—as already described.

Changes and modifications in the specifically described embodiments can be carried out without departing from the principles of the invention which is intended to be limited only by the scope of the appended claims, as interpreted according to the principles of patent law including the doctrine of equivalents.

The embodiments of the invention in which an exclusive property or privilege is claimed are defined as follows:

1. A manually operated lifting device, comprising:
    a pole-changing rotary-current induction motor;
    an interface circuit comprising a manual control switch element having a diode connected in series with a first manual contact element in a signal line and a second manual contact element arranged in parallel with said diode, wherein said control switch element is adapted to generate three different control signals on said signal line depending on the positions of the first manual contact element and said second manual contact element;
    said interface circuit further comprising a motor control comprising a signal decoder and a motor switch;
    said signal decoder connected with said signal line, said signal decoder decoding said three different control signals, said motor switch responsive to said signal decoder for actuating the induction motor.

2. The lifting device of claim 1, wherein said first manual contact element and said second manual contact element being open produce an "OFF" signal as one of said control signals, said first manual contact element being closed and said second manual contact element being open produce a "HALF" one of said control signals in the form of the propagation of a half-wave of the alternating voltage signal on the signal line, and said first manual contact element and said second manual contact element being closed produce an "ON" signal as one of said control signals in the form of the propagation of a full alternating voltage signal on the signal line.

3. The lifting device of claim 2, wherein said first contact element comprises a first pushbutton for a left running function of said induction motor and said second manual contact element comprising a second pushbutton for a right running function of said induction motor and further including a common sequential closing contact element for a fast running function of said induction motor, said common sequential closing contact being adapted to actuating said first pushbutton and said second pushbutton.

4. The lifting device of claim 3, wherein said first manual contact element is assigned to a first conductor of the signal line and said second manual contact element is assigned to a second conductor of the signal line.

5. The lifting device of claim 3 further including an EMERGENCY STOP switch that is hooked up in series with said first and second manual contact elements.

6. The lifting device of claim 2 further including an EMERGENCY STOP switch that is hooked up in series with said first and second manual contact elements.

7. The lifting device of claim 1, wherein said first manual contact element comprises a first pushbutton for a left running function of said induction motor and said second manual contact element comprising a second pushbutton for a right running function of said induction motor and further including a common sequential closing contact element for a fast running function of said induction motor, said common sequential closing contact being adapted to actuating said first pushbutton and said second pushbutton.

8. The lifting device of claim 7, wherein said first manual contact element is assigned to a first conductor of the signal line and said second manual contact element is assigned to a second conductor of the signal line.

9. The lifting device of claim 7 further including an EMERGENCY STOP switch that is hooked up in series with said first and second manual contact elements.

10. The lifting device of claim 1 further including an EMERGENCY STOP switch that is hooked up in series with said first and second manual contact elements.

11. The lifting device of claim 1, wherein said signal decoder comprises at least one other diode for decoding said control signals.

12. An interface circuit for manually controlling movement of a pole changing rotary current induction motor of a lifting device, said interface circuit comprising:
- a manual control switch element comprising a diode connected in series with a first manual contact element in a signal line and a second manual contact element arranged in parallel with said diode, wherein said control switch element is adapted to generate three different control signals on said signal line depending on the positions of the first manual contact element and said second manual contact element;
- a motor control comprising a signal decoder and a motor switch;
- said signal decoder connected with said signal line, said signal decoder decoding said three different control signals, said motor switch responsive to said signal decoder for actuating the induction motor.

13. The interface circuit of claim 12, wherein said first manual contact element and said second manual contact element being open produce an "OFF" signal as one of said control signals, said first manual contact element being closed and said second manual contact element being open produce a "HALF" one of said control signals in the form of the propagation of a half-wave of the alternating voltage signal on the signal line, and said first manual contact element and said second manual contact element being closed produce an "ON" signal as one of said control signals in the form of the propagation of a full alternating voltage signal on the signal line.

14. The interface circuit of claim 13, wherein said first contact element comprises a first pushbutton for a left running function of said induction motor and said second manual contact element comprising a second pushbutton for a right running function of said induction motor and further including a common sequential closing contact element for a fast running function of said induction motor, said common sequential closing contact being adapted to actuating said first pushbutton and said second pushbutton.

15. The interface circuit of claim 14, wherein said first manual contact element is assigned to a first conductor of the signal line and said second manual contact element is assigned to a second conductor of the signal line.

16. The interface circuit of claim 13 further including an EMERGENCY STOP switch that is hooked up in series with said first and second manual contact elements.

17. The interface circuit of claim 12, wherein said first manual contact element comprises a first pushbutton for a left running function of said induction motor and said second manual contact element comprising a second pushbutton for a right running function of said induction motor and further including a common sequential closing contact element for a fast running function of said induction motor, said common sequential closing contact being adapted to actuating said first pushbutton and said second pushbutton.

18. The interface circuit of claim 17, wherein said first manual contact element is assigned to a first conductor of the signal line and said second manual contact element is assigned to a second conductor of the signal line.

19. The interface circuit of claim 17 further including an EMERGENCY STOP switch that is hooked up in series with said first and second manual contact elements.

20. The interface circuit of claim 12 further including an EMERGENCY STOP switch that is hooked up in series with said first and second manual contact elements.

21. The interface circuit of claim 12, wherein said signal decoder comprises at least one other diode for decoding said control signals.

* * * * *